United States Patent [19]

Kurata et al.

[11] Patent Number: 4,598,602

[45] Date of Patent: Jul. 8, 1986

[54] STEERING SYSTEM EQUIPPED WITH STEERING WHEEL CENTER PAD ANTI-ROTATION MECHANISM

[75] Inventors: Hidenori Kurata, Zama; Michiyoshi Takahara, Yokohama, both of Japan

[73] Assignee: Nissan Motor Company, Limited, Japan

[21] Appl. No.: 652,248

[22] Filed: Sep. 19, 1984

[30] Foreign Application Priority Data

Oct. 11, 1983 [JP] Japan ................. 58-189610

[51] Int. Cl.⁴ ............................ B62D 1/04; B62D 1/16
[52] U.S. Cl. .............................. 74/484 R; 74/492; 74/552; 200/61.54; 403/335; 403/380
[58] Field of Search ........... 74/484 R, 492, 552; 200/61.54, 61.57; 403/335, 336, 338, 380

[56] References Cited

U.S. PATENT DOCUMENTS 3,356,392  12/1967  Blum et al. .................... 403/380 X 4,485,371  11/1984  Yamada et al. .............. 200/61.54 X

FOREIGN PATENT DOCUMENTS 49-17167   4/1974  Japan ................. 74/484 R
54-20532   2/1979  Japan ................. 74/492
57-191654  4/1982  Japan .
57-201736  12/1982  Japan ................. 200/61.54
58-139864  8/1983  Japan ................. 74/552

Primary Examiner—Allan D. Herrmann
Attorney, Agent, or Firm—Lowe, Price, Leblanc, Becker & Shur

[57] ABSTRACT

A steering wheel center pad is formed to have a pair of coaxial upper and lower sleeve section on which a pair of upper and lower internal gears are rotatably mounted, respectively. The lower internal gear is held stationary relative to a column by means of one or more tapered anchor legs provided to the lower internal gear and holes provided in a combination switch fixedly attached to the column.

2 Claims, 4 Drawing Figures

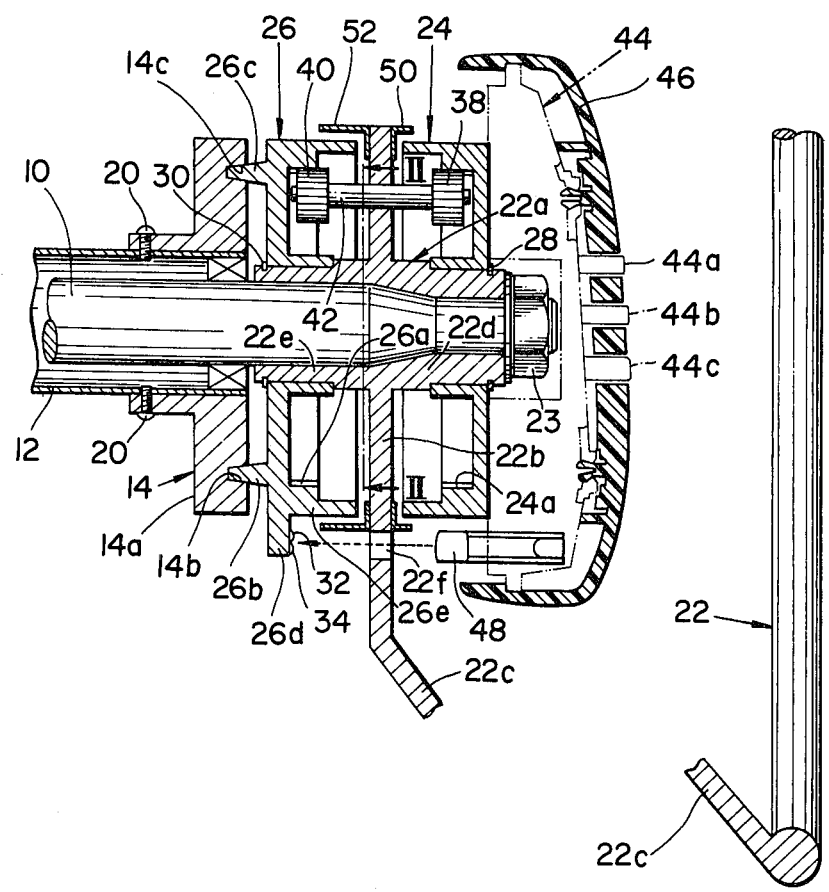

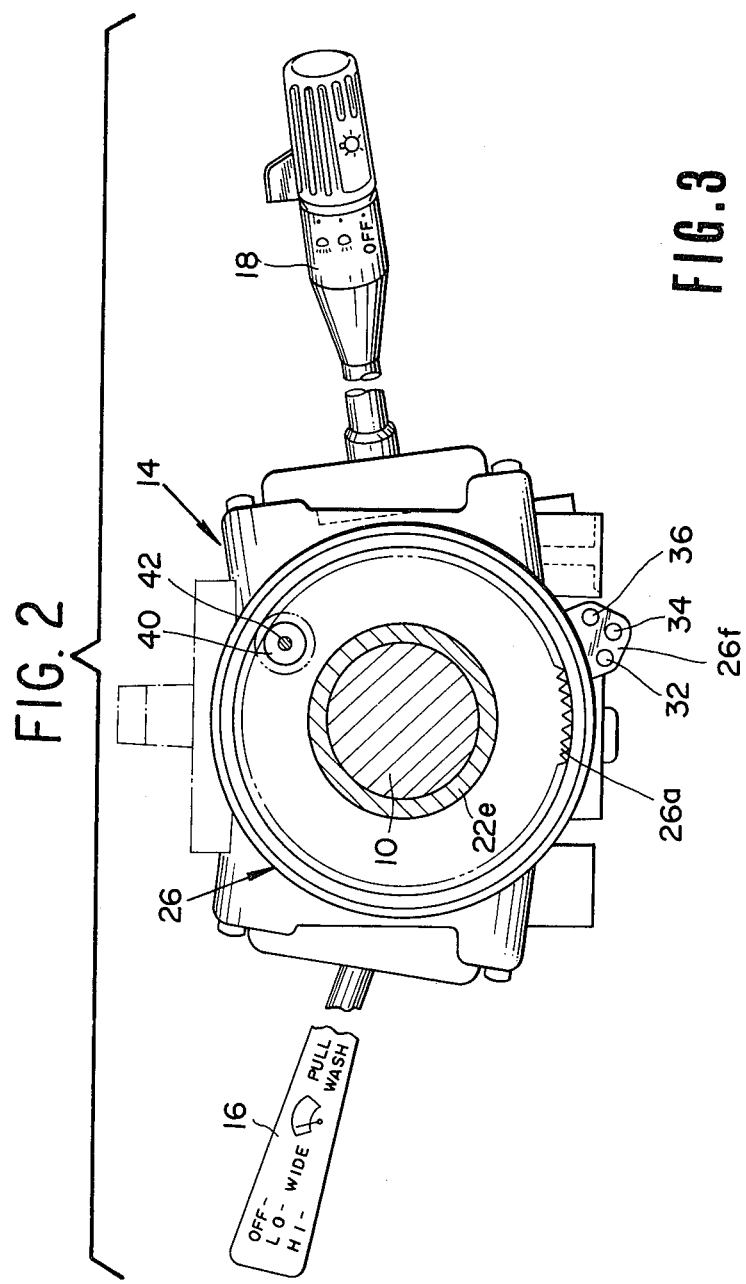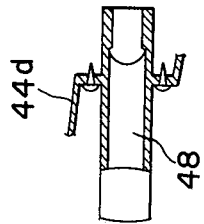

STEERING SYSTEM EQUIPPED WITH STEERING WHEEL CENTER PAD ANTI-ROTATION MECHANISM

BACKGROUND OF THE INVENTION

1. Field of the Invention

The present invention relates in general to steering systems for road vehicles and more particularly to a steering system of the type equipped with an anti-rotation mechanism for holding a steering wheel center pad and so on stationary irrespective of any rotation of the steering wheel.

2. Description of the Prior Art

A steering system equipped with an anti-rotation mechanism generally includes a pair of internal gears, one of which is fixedly mounted on the upper end portion of a jacket or column of a steering column assembly and the other rotatably mounted on a hub portion of a steering wheel and carries thereon a steering wheel center pad and so on, and a pair of pinions rotatably mounted on the hub portion of the steering wheel in such a manner as to rotate with a common pinion shaft while meshing with the internal gears, as is disclosed in the Japanese Provisional Utility Model Publication No. 57-191654. In this kind of steering system, there is a difficulty in axially aligning the internal gears with each other since they are respectively mounted on different parts. Due to this, there tend to result relatively large backlashes between the pinions and the internal gears resulting in undesirable play of the steering wheel center pad.

SUMMARY OF THE INVENTION

In accordance with the present invention, there is provided an improved steering system which comprises, as usual, a stationary column having an upper end portion, a steering shaft concentrically surrounded by the column and having an upper end portion projecting from the upper end portion of the column, and a steering wheel having a hub portion at which it is mounted on the upper end portion of the steering shaft for rotation therewith.

In accordance with the present invention, the hub portion is formed to have an annular flange section and a pair of coaxial upper and lower sleeve sections projecting upwardly and downwardly from the inner periphery of the flange section. The steering system further comprises a pair of upper and lower internal gears rotatably mounted on the upper and lower sleeve sections, respectively, a pinion shaft rotatably mounted on the hub portion, a pair of pinions respectively meshed with the upper and lower internal gears and mounted on the pinion shaft for rotation therewith, and means for preventing rotation of the lower internal gear relative to the column.

This structure is quite effective for eliminating the above noted difficulty of excessive backlash or play since the steering wheel hub portion is now adapted to mount thereon both the upper and lower internal gears.

It is accordingly an object of the present invention to provide an improved steering system of the type having a steering wheel center pad anti-rotation mechanism which makes it possible to install the upper and lower internal gears with a highly-accurate and highly reliable concentricity for thereby eliminating the above noted backlashes leading to undesirable play of the steering wheel center pad.

BRIEF DESCRIPTION OF THE DRAWINGS

The features and advantages of the steering system according to the present invention will become more clearly appreciated from the following description taken in conjunction with the accompanying drawings, in which:

FIG. 1 is a fragmentary sectional view of a steering system according to an embodiment of the present invention;

FIG. 2 is a sectional view taken along the line II—II of FIG. 1; and

FIG. 3 is a sectional view showing a mounting for a light emitting diode incorporated in the steering system of FIG. 1.

FIG. 4 is a partial sectional view of a steering wheel spoke and rim.

DETAILED DESCRIPTION OF THE PREFERRED EMBODIMENT

Referring to FIGS. 1 to 4, inclusive, a steering system according to an embodiment of the present invention is shown as comprising a steering shaft 10 which is concentrically surrounded by a jacket or column 12 which is in turn supported on a vehicle body by means of a column bracket or the like, for simplicity not shown in the drawing. On the upper end portion of the column 12 there is mounted a combination switch 14 consisting of an annular casing 14a surrounding the column 12. The combination switch 14 includes a windshield wiper and washer switch 16 and a light/turn signal/passing light switch 18 and is fixedly attached to the upper end portion of the steering column 12 by means of a plurality of screws 20. The combination switch casing 14a is formed at the upper end thereof with a pair of tapered holes 14b and 14c, which are preferably arranged at diametrically opposed positions, for a purpose which will be described hereinafter.

A steering wheel is generally indicated by the reference numeral 22 and is mounted at its hub portion 22a on the upper end portion of the steering shaft 10 and secured thereto by a nut 23 for rotation therewith. The hub portion 22a is in the form of an annular flange section 22b, to the outer periphery of which is connected a spoke portion or portions 22c, and coaxial upper and lower sleeve sections 22d and 22e projecting upwardly and downwardly from the inner periphery of the flange section 22b, respectively. On the upper and lower sleeve sections 22d and 22e there are rotatably and coaxially mounted a pair of upper and lower internal gears 24 and 26 which are axially held in place by means of snap rings 28 and 30 fitted in the sleeve sections 22d and 22e and shoulders (no numeral) formed in same. The upper and lower internal gears 24 and 26 have teeth 24a and 26a which are of the same pitch circle diameter and diametrical pitch. The lower internal gear 26 has at the lower end thereof preferably a pair of anchor legs 26b and 26c which are shaped to correspond to the taper holes 14b and 14c of the combination switch casing 14a so as to fit in the same without any clearance therebetween. By the engagement of the anchor legs 26b and 26c and the holes 14b and 14c, the lower internal gear 26 is held stationary relative to the combination switch 14 and therefore the column 12. The lower internal gear 26 also has an outward projection 26d projecting radially outwardly from its rim 26e to mount there at a plurality of photo transistors 32, 34 and 36 which will be described again hereinafter.

A pair of pinions 38 and 40 are mounted on a common pinion shaft 42 for rotation therewith, which pinion shaft 42 is in turn rotatably mounted on the hub portion 22a of the steering wheel 22 in such a manner as to allow the pinions 38 and 40 to respectively mesh with the teeth 24a and 26a of the upper and lower internal gears 24 and 26.

A switch gear 44 which includes a plurality of switch buttons 44a, 44b and 44c is mounted in a steering wheel center pad 46 which is in turn mounted on the upper internal gear 24. The switch gear 44 also includes a light emitting diode 48 which is mounted in a casing 44d of the switch gear 44 as shown in FIG. 3 and arranged at a position opposing, axially of the steering shaft 10, to the photo transistors 32, 34 and 36 so that light emitted by the light emitting diode 48 is received by the photo transistors 32, 34 and 36. To this end, the hub portion 22a of the steering wheel 22 is formed with a plurality of slits or holes 22f which are arranged in a circular array so that the light emitted by the light emitting diode 48 passes through some of the holes 22d to reach some of the photo transistors 32, 34 and 36 at any angular position of the steering wheel 22. Light received by some of the photo transistors 32, 34 and 36 is transmitted to a receiver unit (not shown) which in turn sends signals to, for example, radio audio and cruise control systems. Designated by the reference numerals 50 and 52 are annular cover members which are respectively attached to the upper and lower surfaces of the steering wheel hub portion 22a to cover the spaces between the hub portion 22a and the internal gears 24 and 26 for preventing entry of foreign objects into the insides of the internal gears 24 and 26.

The above structure makes it possible to install the upper and lower internal gears 24 and 26 with a highly accurate and highly reliable concentricity since they are mounted on a common part, i.e., on the upper and lower sleeve sections 22d and 22e of the integral hub portion 22a. Further, the pinion shaft 42 is rotatably mounted on the hub portion 22a with which the sleeve sections 22d and 22e are formed integral. The above structure of the present invention is therefore quite effective for eliminating the aforementioned backlashes inherent in the prior art steering systems.

What is claimed is:

1. A steering system, comprising:
    a stationary column having an upper end portion;
    a steering shaft concentrically surrounded by said column and having an upper end portion projecting from the upper end portion of said column;
    a steering wheel having a hub portion at which it is mounted on the upper end portion of said steering shaft for rotation therewith;
    said hub portion being formed to have an annular flange section and coaxial upper and lower sleeve sections projecting upwardly and downwardly, respectively, from the inner periphery of said flange section;
    a pair of upper and lower internal gears, rotatably mounted on said upper and lower sleeve sections respectively;
    pinion means rotatably mounted on said hub portion for meshing with said upper and lower internal gears to drivingly interconnect the same; and
    means for preventing rotation of said lower internal gear relative to said column, said preventing means including an anchor leg provided to said lower internal gear and an annular member fixedly attached to the upper end of said stationary column and formed with a hole in which said anchor leg is fitted;
    in which said annular member comprises a casing of a combination switch.

2. A steering system, as set forth in claim 1, wherein:
    said pinion means comprises a pinion shaft rotatably mounted on said hub portion and a pair of pinions respectively meshed with said upper and lower internal gears and mounted on said pinion shaft for rotation therewith.

* * * * *